(No Model.)  2 Sheets—Sheet 1.
J. W. GRANT.
HOSE VALVE.
No. 509,371.  Patented Nov. 28, 1893.
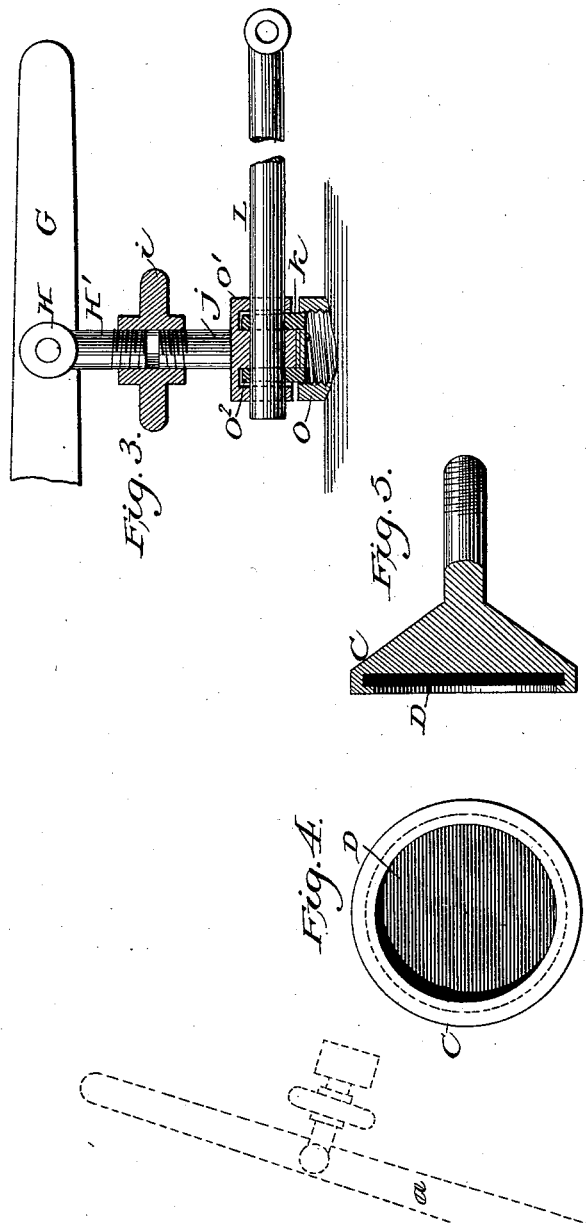
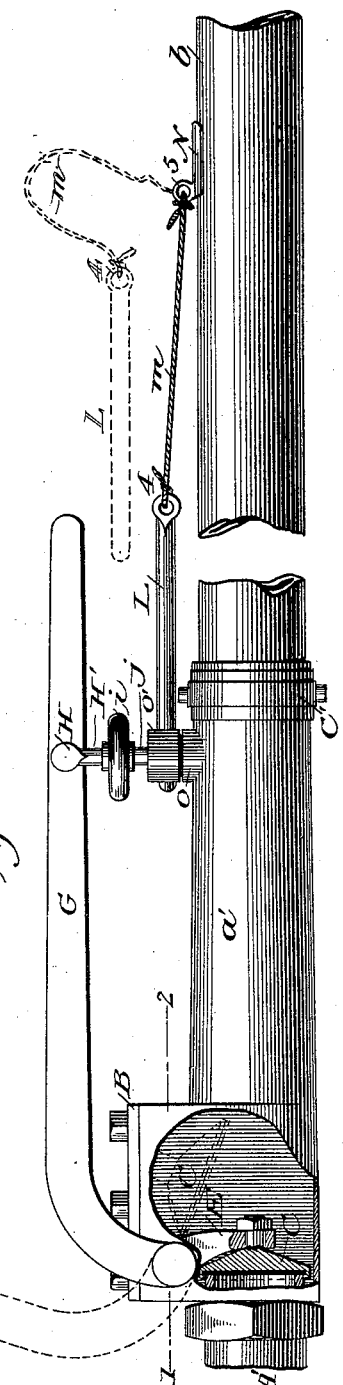
Witnesses.
Mark A. Williams.
A. H. Davis.
Inventor:
James W. Grant
by Geo. E. Bird
Atty (No Model.) 2 Sheets—Sheet 2.

J. W. GRANT.
HOSE VALVE.

No. 509,371. Patented Nov. 28, 1893.

Witnesses.
Mark A. Williams,
A. H. Davis.

Inventor.
James W. Grant.
by Geo. E. Buell
Atty.

UNITED STATES PATENT OFFICE.

JAMES WESLEY GRANT, OF ORONO, MAINE.

HOSE-VALVE.

SPECIFICATION forming part of Letters Patent No. 509,371, dated November 28, 1893.

Application filed June 19, 1893. Serial No. 478,180. (No model.)

*To all whom it may concern:*

Be it known that I, JAMES WESLEY GRANT, a citizen of the United States, residing at Orono, in the county of Penobscot and State of Maine, have invented certain new and useful Improvements in Hose-Valves; and I do hereby declare that the following is a full, clear, and exact description of the invention, which will enable others skilled in the art to which it appertains to make and use the same.

My invention relates to improvements in "hose valves" in which a valve is combined with a lever and releasing or tripping gear, the object of my improvement being to provide a simple, light and durable valve for hose used for the extinguishment of fires or other purposes where it is necessary to use a flexible hose to convey water to a distance from the point of connection of the hose with the water supply.

Figure 8:
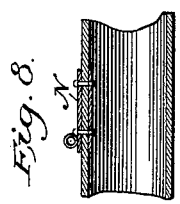
Figure 7:
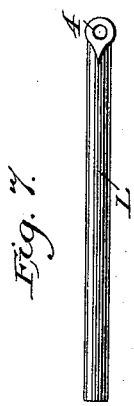
Figure 6:
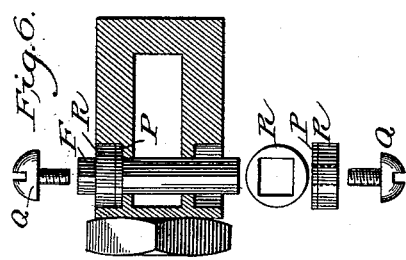
Figure 2:
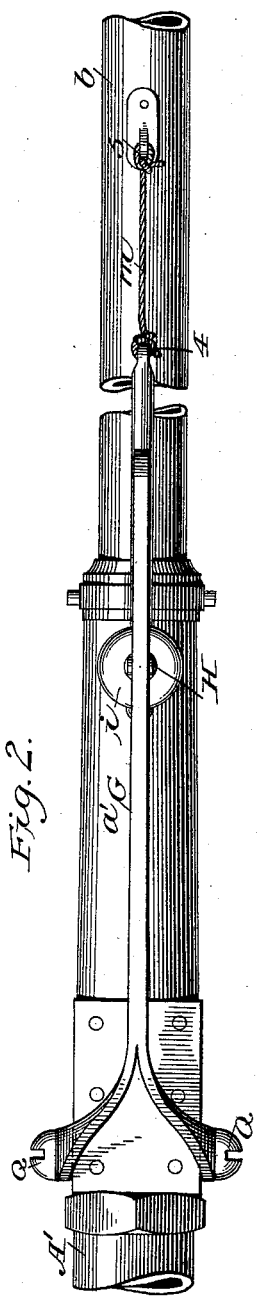

In the drawings:—Figure 1. is a side elevation of the machine, that portion of the pipe surrounding the valve being broken out. Fig. 2. is a top plan of the machine. Fig. 3. is a vertical section of the releasing or tripping device. Fig. 4. is an end view of the valve. Fig. 5. is a vertical section of the valve. Fig. 6. is a longitudinal section on the line 1, 2 of Fig. 1, showing the rock shaft, packing collars and screws. Fig. 7. is a side view of the tripping pin. Fig. 8 is a sectional view of the plate N attached to the hose.

A' is a water supply pipe to which is closely connected a rigid tube $a'$ which may be of slightly larger diameter at the point of connection than the pipe A'. This tube $a'$ is provided, at the end where the connection is made with the pipe A', with a rectangular chamber B. Within the chamber is a valve C constructed substantially, as shown in Fig. 5, provided with a packing of rubber or similar material D.

Rigidly attached to the pin of the valve is a bell crank E, which at its upper end is rigidly connected with the rock shaft F, see Fig. 6; the shaft being journaled in the upper part of the walls of the chamber B. See Fig. 6.

G is a lever which may be bifurcated at one end and the bifurcations rigidly connected with the rock shaft F in the manner shown in Figs. 2 and 6. Near its other end the lever G is provided with the pin H' depending from the under side of said lever and provided at its lower end with a thread.

$i$ is a hand-wheel with right and left hand threads, in which from above is screwed the pin H' and from below the standard $j$, which is rigidly connected with a cylinder O', which may be made either hollow or provided with annular apertures.

Directly beneath the cylinder O' and attached to the upper part of the pipe $a'$ is a hollow cylinder O, threaded within. Into the cylinder O is screwed the cylinder $O^2$, the exterior of which is slightly less than the diameter of the interior of the cylinder O' and which may be solid or hollow in order to conform to the construction of the cylinder O'. Both these cylinders are provided with apertures to admit the pin L which register when the cylinder $O^2$ is placed within the cylinder O'.

L (see Fig. 7) is a pin of a diameter very slightly less than that of the apertures in the cylinders and terminating at one end in a ring 4 or similar device.

The flexible hose $b$ is connected with the pipe $a'$ by the ordinary coupling. Upon the top of the flexible hose a short distance from the coupling, as shown in Fig. 1, is fixed the plate N provided upon its upper surface with a ring 5. The rings 4 and 5 are connected together by a cord $m$ or other flexible material; the length of the cord $m$ being somewhat less than the distance between the rings 4 and 5 measured upon the hose $b$ when the latter is fully extended.

The operation of the device will be readily perceived. Occasion arising for the use of the hose the pipe or nozzle is carried to the point where the water is designed to be used, care being taken not to fully extend the hose until the place of use has been reached. The hose is then drawn taut from the coupling C' by means of which movement the pin L is drawn from the cylinders O' and $O^2$ and the lever G released, allowing the valve C to open, the lever G assuming the position shown in dotted lines in Fig. 1. The swiveling arrangement of the cylinders O' and $O^2$ permits the pin to be readily drawn whatever may be the direction in which the hose is conducted, as the pin follows the line of the hose. The right and left hand threads of the hand wheel $i$ not only enable the length of the device retaining the lever G to be adjusted, but also to be maintained at exactly the same length in whatever position it may be placed by the direction in which the hose is carried.

The chamber is made water tight around the rock shaft F, as shown in Fig. 6, by means of the screws Q, collars R and washers P. The latter being of leather or other elastic material are held against the metallic sides of the chamber, the bifurcations of the lever being held between the screws Q and collars R.

What I claim is—

1. In combination with a flexible hose for fire or other purposes a valve controlled by a lever, an adjustable and compensating rotary coupling with a pin retaining said lever and a connection between said hose and pin, substantially as described.

2. In combination with a flexible hose for fire or other purposes a valve controlled by a lever, a rotary coupling and pin holding said lever and means connected with said hose for releasing said pin, substantially as described.

3. The combination of a flexible hose for fire or other purposes, with a valve lever controlling the water supply, a rotary coupling and pin retaining said lever, and a flexible connection between said pin and said hose, substantially as described.

In testimony that I claim the foregoing as my invention I have hereunto set my hand this 14th day of June, A. D. 1893.

JAMES WESLEY GRANT.

In presence of—
JOHN E. CUNNINGHAM,
JOHN WOOLACOTT.